US006868598B2

(12) United States Patent
Spittle et al.

(10) Patent No.: US 6,868,598 B2
(45) Date of Patent: Mar. 22, 2005

(54) EQUIPMENT DEPLOYMENT METHOD AND APPARATUS

(75) Inventors: Jeffrey Roy Spittle, Torfaen (GB); Ian Charles Darney, Cardiff (GB)

(73) Assignee: Tecsec Europe Limited, Torfaen (GB)

( * ) Notice: Subject to any disclaimer, the term of this patent is extended or adjusted under 35 U.S.C. 154(b) by 304 days.

(21) Appl. No.: 10/119,373

(22) Filed: Apr. 9, 2002

(65) Prior Publication Data

US 2003/0188416 A1 Oct. 9, 2003

(51) Int. Cl.[7] .......................... B23Q 3/00; B21D 39/03; B23P 19/00
(52) U.S. Cl. .............................. 29/464; 29/428; 29/759
(58) Field of Search .......................... 29/428, 464, 466, 29/468, 85, 706, 714, 721, 729, 759, 760

(56) References Cited

U.S. PATENT DOCUMENTS

| | | | |
|---|---|---|---|
| 3,570,812 A | | 3/1971 | Pinkbeiner |
| 4,115,845 A | * | 9/1978 | Blahut |
| 5,927,440 A | | 7/1999 | Freeman |

FOREIGN PATENT DOCUMENTS

| | | |
|---|---|---|
| CA | 2192757 A1 | 6/1997 |
| EP | 0006076 | 12/1979 |
| EP | 0542168 A1 | 5/1993 |
| FR | 2190718 | 2/1974 |
| FR | 2658180 A1 | 8/1991 |
| JP | 8-243955 A | 9/1996 |
| WO | WO 92/04269 A1 | 3/1992 |
| WO | WO02081962 | * 10/2002 |

* cited by examiner

*Primary Examiner*—John C. Hong
(74) *Attorney, Agent, or Firm*—Edwin D. Schindler

(57) ABSTRACT

A method and apparatus for deploying assemblies, for example, for surveillance equipment, in which a single remotely-operated carriage is used to position each assembly, in turn, on a respective upright support pole. The carriage can be moved away from the assembly when the assembly is located at a desired position on the support pole. Assemblies may, therefore, be deployed more cost effectively than by existing methods and apparatus, which require each assembly to be motorized.

61 Claims, 10 Drawing Sheets

EQUIPMENT DEPLOYMENT METHOD AND APPARATUS

BACKGROUND OF THE INVENTION

The present invention relates to a method and apparatus for deploying assemblies, e.g of lighting or surveillance equipment.

It is known to temporarily deploy equipment, e.g. lighting and/or surveillance equipment, at an elevated position on an upright support pole by fixing the equipment to a motorised carriage which is remotely operable to ascend and descend the pole.

Releaseable, adjustable means for securing the carriage to the pole allow the apparatus to be readily relocated to any site having a suitable support structure. For example, the carriage may be secured to a structure such as a lamp-post or telegraph pole to allow a localised traffic situation or civil disturbance to be monitored by police.

A significant limitation of such an apparatus is its great cost, which is of particular consideration where several carriages are required to position equipment at different locations.

SUMMARY OF THE INVENTION

We have now devised a method and apparatus which overcome the limitations of existing methods and apparatus for positioning equipment on an upright pole.

In accordance with the present invention, there is provided a method for deploying assemblies of equipment and comprising the steps of:

providing an assembly of equipment comprising remotely-operable means for securing the assembly to an upright pole at an elevated position;

providing a remotely-operable, motorised carriage arranged to be detachably mounted to the pole;

attaching the motorised carriage to the pole;

remotely operating the motorised carriage to raise the assembly to said elevated position;

operating the securing means of the assembly to secure the assembly to the pole at said elevated position;

operating the motorised carriage to descend the pole, leaving the assembly secured to the pole at said elevated position; and detaching the motorised carriage from the pole.

Thus, the method is more cost effective than existing methods which require a separate motorised carriage to be provided at each site at which an assembly of equipment is to be deployed.

Also in accordance with the present invention, there is provided an apparatus for deploying assemblies of equipment and comprising:

an assembly of equipment comprising remotely-operable means for securing the assembly to an upright pole at an elevated position; and a remotely-operable, motorised carriage arranged to be detachably mounted to the pole for raising the assembly to, and lowering the assembly from, said elevated position, the motorised carriage being separable from the assembly when the latter is secured to the pole at said elevated position, to allow the carriage to descend and be detached from the pole.

Preferably the motorised carriage comprises a traction unit for mounting substantially on one side of the pole, the traction unit being held in contact with the pole by at least one pair of opposed arms, the two arms of the or each pair being pivotally mounted to, and extending forwards from the traction unit on either side of the pole, the distal ends of the two arms being biassed towards one-another and towards the traction unit to urge respective rollers, provided at each of those ends, into contact with the pole.

Preferably the traction unit is held in contact with the pole by an upper pair and a lower pair of opposed arms.

Preferably the motorised carriage is arranged such that, when fitted to a cylindrical pole of a given radius, the two rollers of the or each pair of arms extend radially from the surface of the pole.

Preferably, the traction unit comprises at least one pair of pole-engaging wheels having coplanar axes of rotation, at least one of the wheels being a drive wheel.

The two wheels of the or each pair may be arranged to rotate in adjacent, parallel planes to engage the pole on either side of its central longitudinal axis, the opposed peripheral edges of the two wheels preferably being bevelled to present respective tangential drive surfaces to a cylindrical pole.

Alternatively, the two wheels of the or each pair may be arranged to rotate in respective planes extending radially from the surface of a cylindrical pole of a given radius.

Preferably the traction unit comprises at least an upper and a lower pole-engaging wheel, at least one of the wheels being a drive wheel.

Most preferably, the traction unit comprises an upper pair and a lower pair of pole engaging wheels.

Preferably the distal end of each arm is biassed into contact with the pole by a respective tensioning device, for example a coiled spring, which is pivotally connected between the traction unit and the arm, preferably at a point substantially midway along the length of the arm.

Preferably the assembly comprises a skate for mounting substantially on one side of the pole, the skate being held in contact with the pole by at least one pair of opposed arms, the two arms of the or each pair being pivotally mounted to, and extending forwards from the skate on either side of the pole, the distal ends of the two arms being biassed towards one-another and towards the skate to urge respective rollers, provided at each of those ends, into contact with the pole.

Preferably the skate is held in contact with the pole by an upper pair and a lower pair of opposed arms.

Preferably the assembly is arranged such that, when fitted to a cylindrical pole of a given radius, the two rollers of the or each pair of arms extend radially from the surface of the pole.

Preferably the skate comprises at least one pair of free-rolling, pole-engaging wheels having coplanar axes of rotation.

The two wheels of each pair may be arranged to rotate in adjacent, parallel planes to engage the pole on either side of its central longitudinal axis, the opposed peripheral edges of the two wheels preferably being bevelled to present respective tangential surfaces to a cylindrical pole.

Alternatively, the two wheels of the or each pair may be arranged to rotate in respective planes extending radially from the surface of a cylindrical pole of a given radius.

Preferably the skate comprises at least an upper and a lower pole-engaging wheel.

Most preferably, the skate comprises an upper pair and a lower pair of pole engaging wheels.

Preferably the distal end of each arm is biassed into contact with the pole by a respective tensioning device, for example a coiled spring, which is pivotally connected between the skate and the arm, preferably at a point substantially midway along the length of the arm.

Preferably the skate is weighted to counter-balance the weight of the equipment supported on the opposite side of the pole.

Preferably the securing means comprise at least one pole-engaging device, the or each pole engaging device being operated by an electrical actuator which may be powered by a battery carried by the skate or supplied with power via an electrical connection, formed between the carriage and the platform when the two parts are in contact with one another. In the former case, the battery preferably provides a counter-balance weight for equipment, e.g. a light and/or surveillance equipment, supported on the opposite side of the pole.

Preferably the or each actuator comprises a linear actuator, which may comprise a respective solenoid arranged to displace a respective clamping member (normally biassed into contact with the surface of the pole) away from the pole surface, but more preferably comprises a respective screw arranged to drive a respective clamping member towards or away from the surface of the pole.

Preferably the assembly comprises a skate as described above and the securing means comprise a clamping member arranged to be driven against the opposite side of the pole to the skate.

Further in accordance with the present invention, there is provided an assembly, e.g. of surveillance equipment, arranged to be raised and lowered by a separable motorised carriage, the assembly comprising remotely-operable means for securing the assembly to an upright pole at an elevated position, to allow the assembly to remain in situ at said elevated position as the motorised carriage is lowered away therefrom.

Preferably the assembly comprises a skate for mounting substantially on one side of the pole, the skate being held in contact with the pole by at least one pair of opposed arms, the two arms of the or each pair being pivotally mounted to, and extending forwards from the skate on either side of the pole, the distal ends of the two arms being biassed towards one-another and towards the skate to urge respective rollers, provided at each of those ends, into contact with the pole.

Preferably the skate is held in contact with the pole by an upper pair and a lower pair of opposed arms.

Preferably the or each assembly is arranged such that, when fitted to a cylindrical pole of a given radius, the two rollers of the or each pair of arms extend radially from the surface of the pole.

Preferably the skate comprises at least one pair of free-rolling, pole-engaging wheels having coplanar axes of rotation.

The two wheels of each pair may be arranged to rotate in adjacent, parallel planes to engage the pole on either side of its central longitudinal axis, the opposed peripheral edges of the two wheels preferably being bevelled to present respective tangential surfaces to a cylindrical pole.

Alternatively, the two wheels of the or each pair may be arranged to rotate in respective planes extending radially from the surface of a cylindrical pole of a given radius.

Preferably the skate comprises at least an upper and a lower pole-engaging wheel.

Most preferably, the skate comprises an upper pair and a lower pair of pole engaging wheels.

Preferably the distal end of each arm is biassed into contact with the pole by a respective tensioning device, for example a coiled spring, which is pivotally connected between the skate and the arm, preferably at a point substantially midway along the length of the arm.

Preferably the platform is arranged to support equipment, e.g. a light and/or a surveillance camera, on the opposite side of the pole to the skate.

Preferably the skate is weighted to counter-balance the weight of the equipment supported on the opposite side of the pole.

Preferably the securing means comprise at least one pole-engaging device, the or each pole-engaging device being operated by an electrical actuator which may be powered by a battery carried by the skate or supplied with power via an electrical connection, formed between the carriage and the platform when the two parts are in contact with one another. In the former case, the battery preferably provides a counter-balance weight for equipment, e.g. a light and/or surveillance equipment, supported on the opposite side of the pole.

Preferably the or each actuator comprises a linear actuator, which may comprise a respective solenoid arranged to displace a respective clamping member (normally biassed into contact with the surface of the pole) away from the pole surface, but more preferably comprises a respective screw arranged to drive a respective clamping member towards or away from the surface of the pole.

Preferably the assembly comprises a skate as described above and the securing means comprise a clamping member arranged to be driven against the opposite side of the pole to the skate.

Still further in accordance with the present invention, there is provided an apparatus for deploying an assembly, e.g. of surveillance equipment, the apparatus comprising a motorised carriage having a traction unit for mounting substantially on one side of an upright pole, the traction unit being held in contact with the pole by at least one pair of opposed arms, the two arms of the or each pair being pivotally mounted to, and extending forwards from the traction unit on either side of the pole, the distal ends of the two arms being biassed towards one-another and towards the traction unit to urge respective rollers, provided at each of those ends, into contact with the pole.

Preferably the motorised carriage comprises a traction unit for mounting substantially on one side of the pole, the traction unit being held in contact with the pole by at least one pair of opposed arms, the two arms of the or each pair being pivotally mounted to, and extending forwards from the traction unit on either side of the pole, the distal ends of the two arms being biassed towards one-another and towards the traction unit to urge respective rollers, provided at each of those ends, into contact with the pole.

Preferably the traction unit is held in contact with the pole by an upper pair and a lower pair of opposed arms.

Preferably the motorised carriage is arranged such that, when fitted to a cylindrical pole of a given radius, the two rollers of the or each pair of arms extend radially from the surface of the pole.

Preferably, the traction unit comprises at least one pair of pole-engaging wheels having coplanar axes of rotation, at least one of the wheels being a drive wheel.

The two wheels of the or each pair may be arranged to rotate in adjacent, parallel planes to engage the pole on either side of its central longitudinal axis, the opposed peripheral edges of the two wheels preferably being bevelled to present respective tangential drive surfaces to a cylindrical pole.

Alternatively, the two wheels of the or each pair may be arranged to rotate in respective planes extending radially from the surface of a cylindrical pole of a given radius.

Preferably the traction unit comprises at least an upper and a lower pole-engaging wheel, at least one of the wheels being a drive wheel.

Most preferably, the traction unit comprises an upper pair and a lower pair of pole engaging wheels.

Preferably the distal end of each arm is biassed into contact with the pole by a respective tensioning device, for example a coiled spring, which is pivotally connected between the traction unit and the arm, preferably at a point substantially midway along the length of the arm.

Embodiments of the present invention will now be described by way of examples only and with reference to the accompanying drawings.

DETAILED DESCRIPTION OF THE INVENTION

Figure 1:
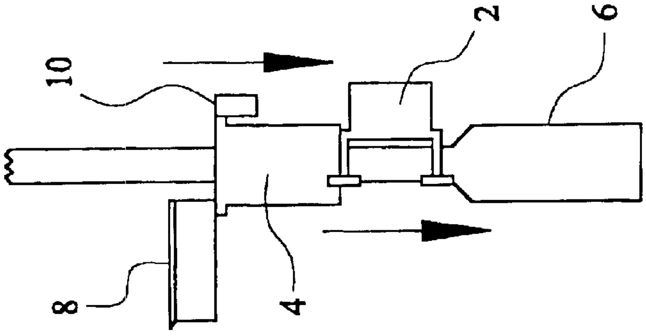
FIGS. 1 to 5 are a sequence of schematic views illustrating a method for deploying an assembly, e.g. of surveillance equipment, in accordance with the present invention.

Referring to FIG. 1 of the drawings, an apparatus comprising a motorised carriage 2 and an assembly 4 is shown fitted to an upright pole 6.

The assembly 4 comprises a platform 8 to which equipment, e.g. lighting or surveillance equipment may be fitted, and a counterbalance weight 10.

Figure 2:
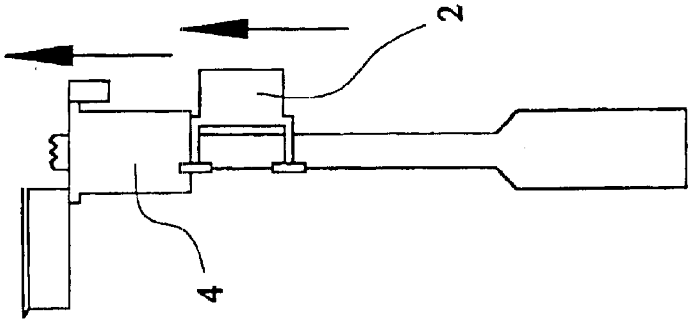

To position the assembly 4 at an elevated position on the pole 6, the carriage 2 is first operated to ascend the pole 6, as shown in FIG. 2.

Figure 3:
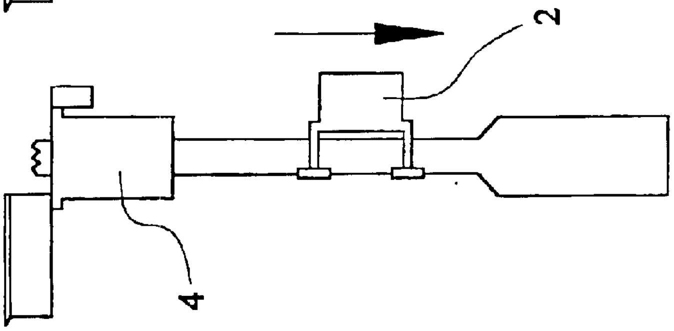

Once the assembly 4 has been raised to a suitable height, the carriage 2 then drops away, as shown in FIG. 3, leaving the assembly 4 in place. Various methods may be employed to fix the assembly 4 in place upon the pole at its elevated position, some of which will be described hereinafter.

With the assembly 4 secured in place, the carriage 2 may then be removed from the pole 6 and used to raise further equipment assemblies into position on other poles.

Figure 4:
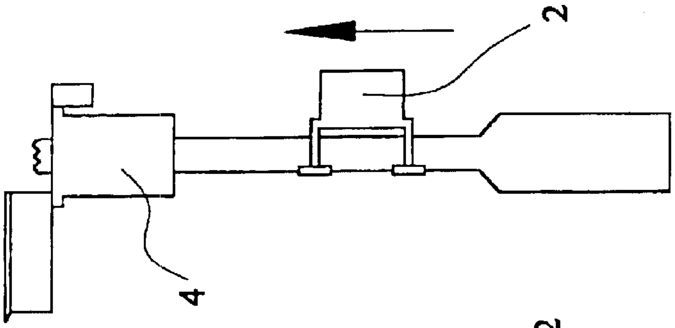
Figure 5:
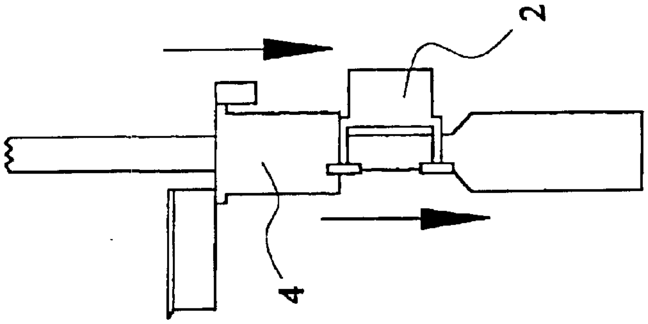
Figure 6:
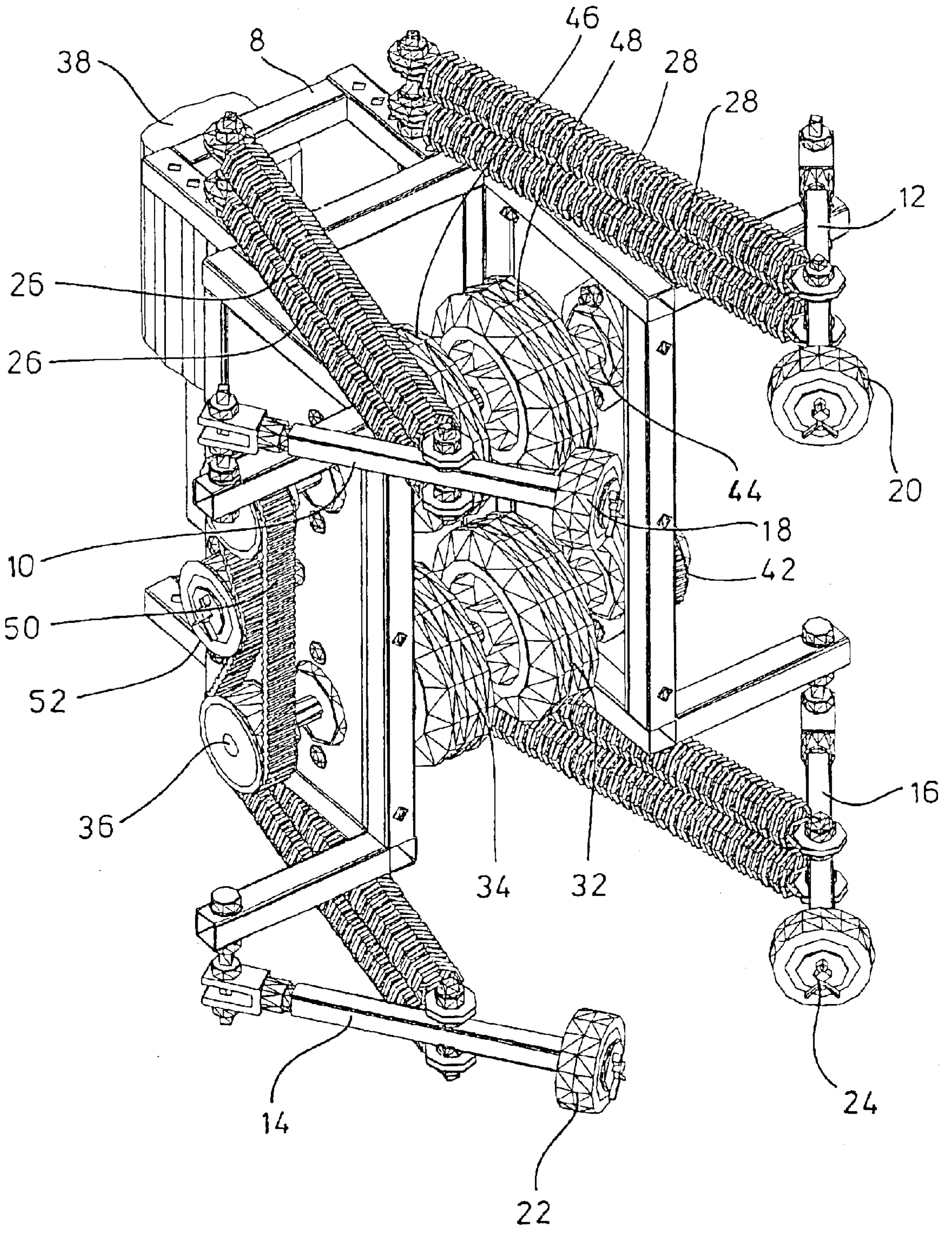
FIGS. 6 and 7 are respective front and rear perspective views of a preferred embodiment of carriage in accordance with the present invention.
Figure 7:
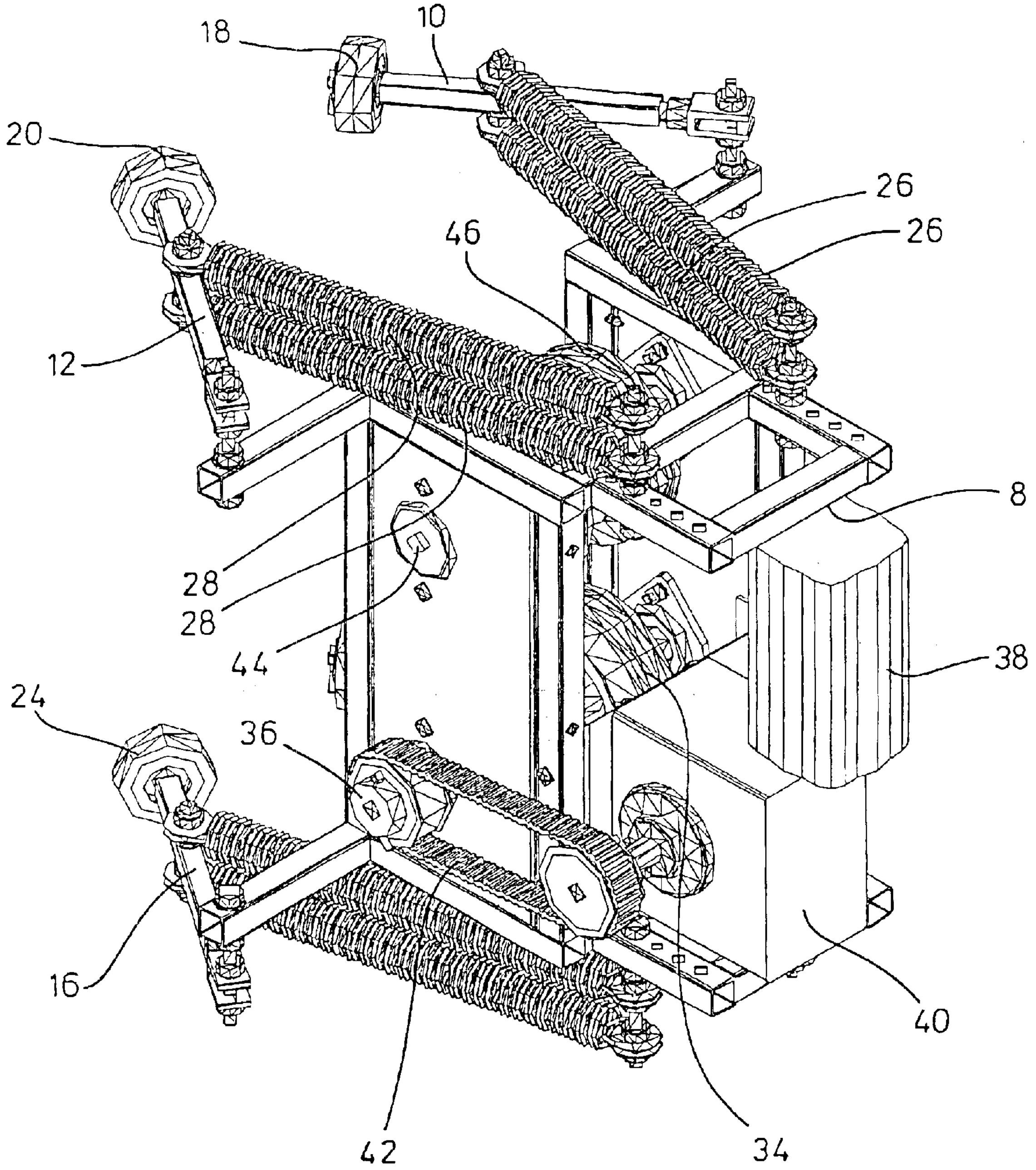
Figure 8:
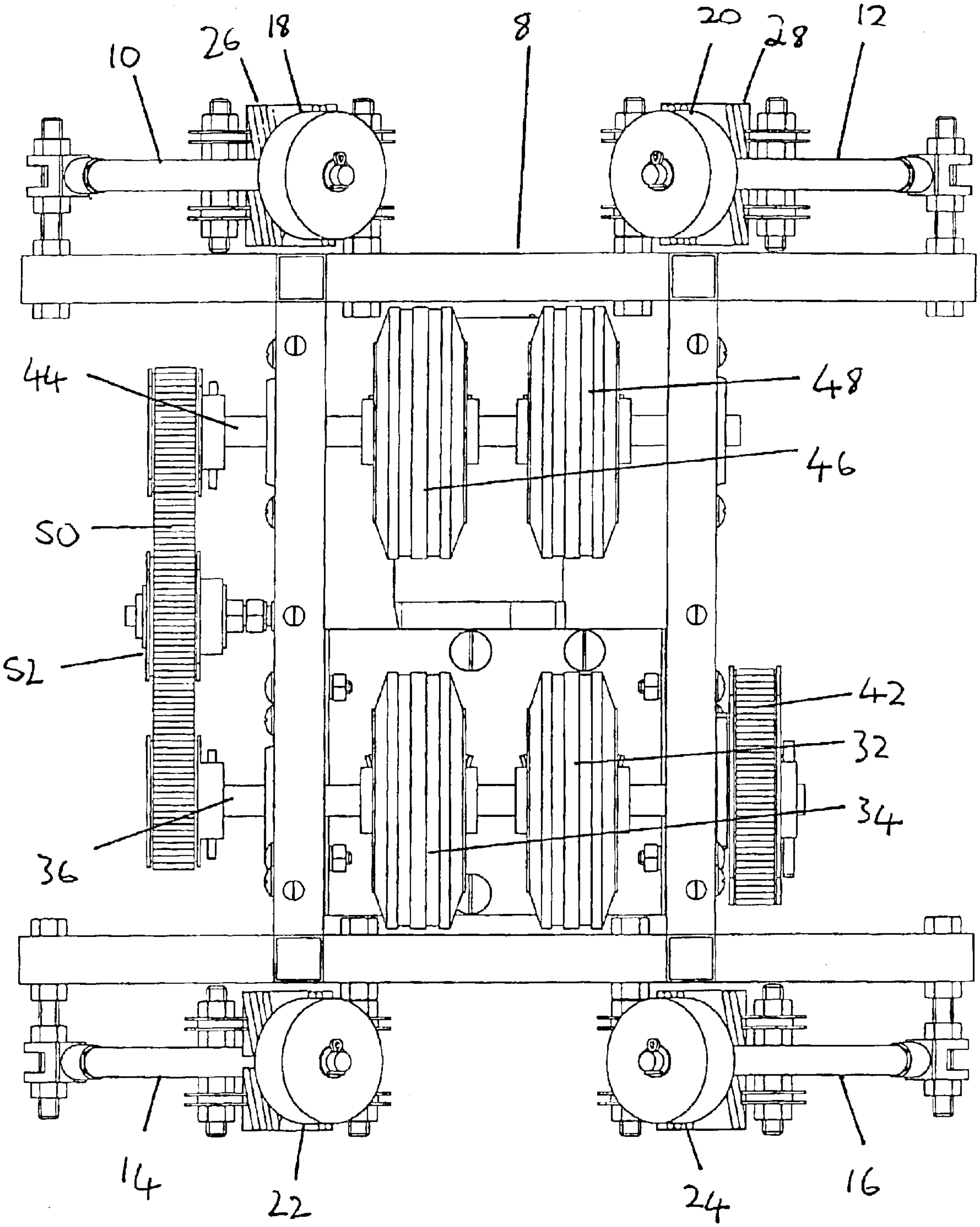
FIG. 8 is a front elevation of the carriage of FIGS. 6 and 7.
Figure 9:
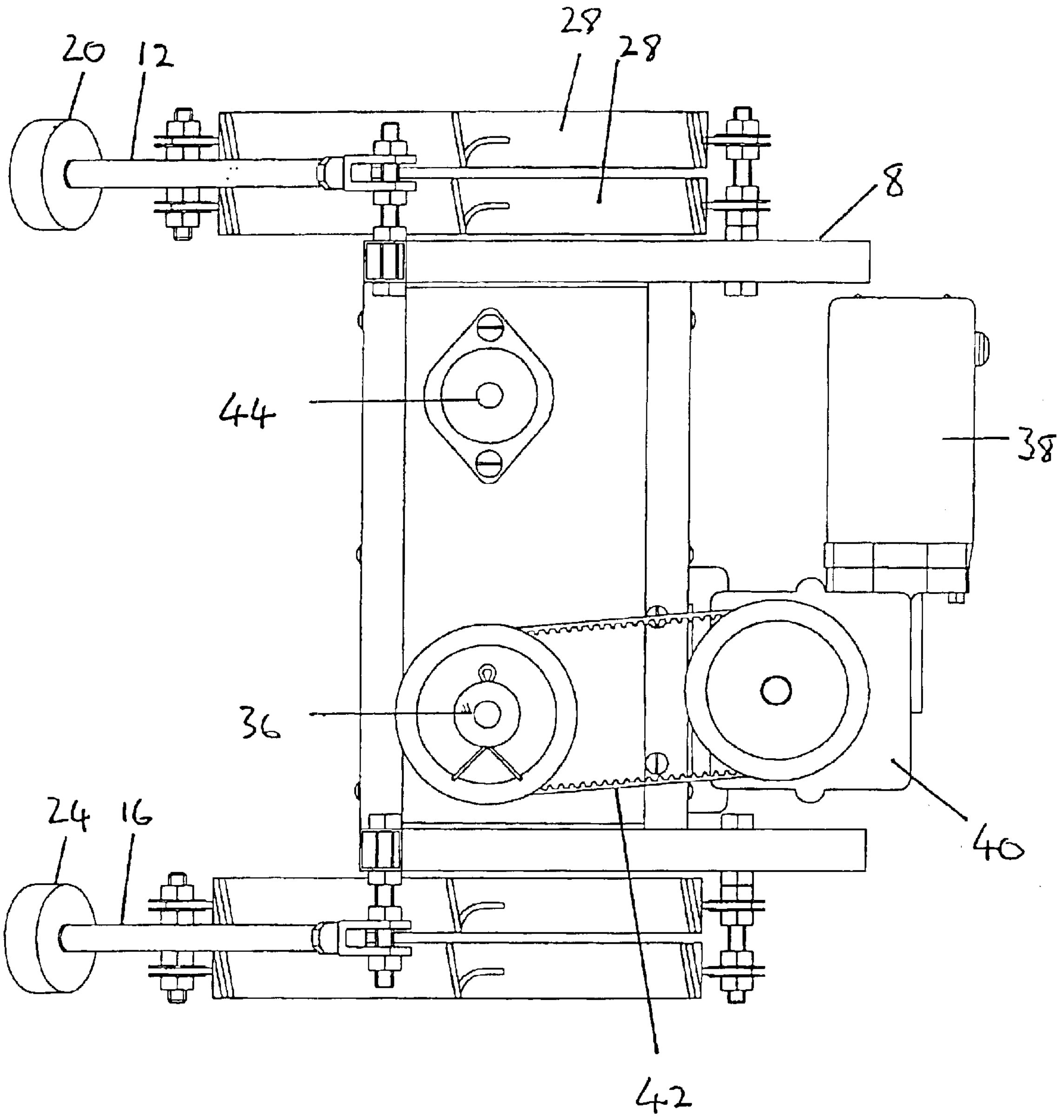
FIG. 9 is a side elevation of the carriage.
Figure 10:
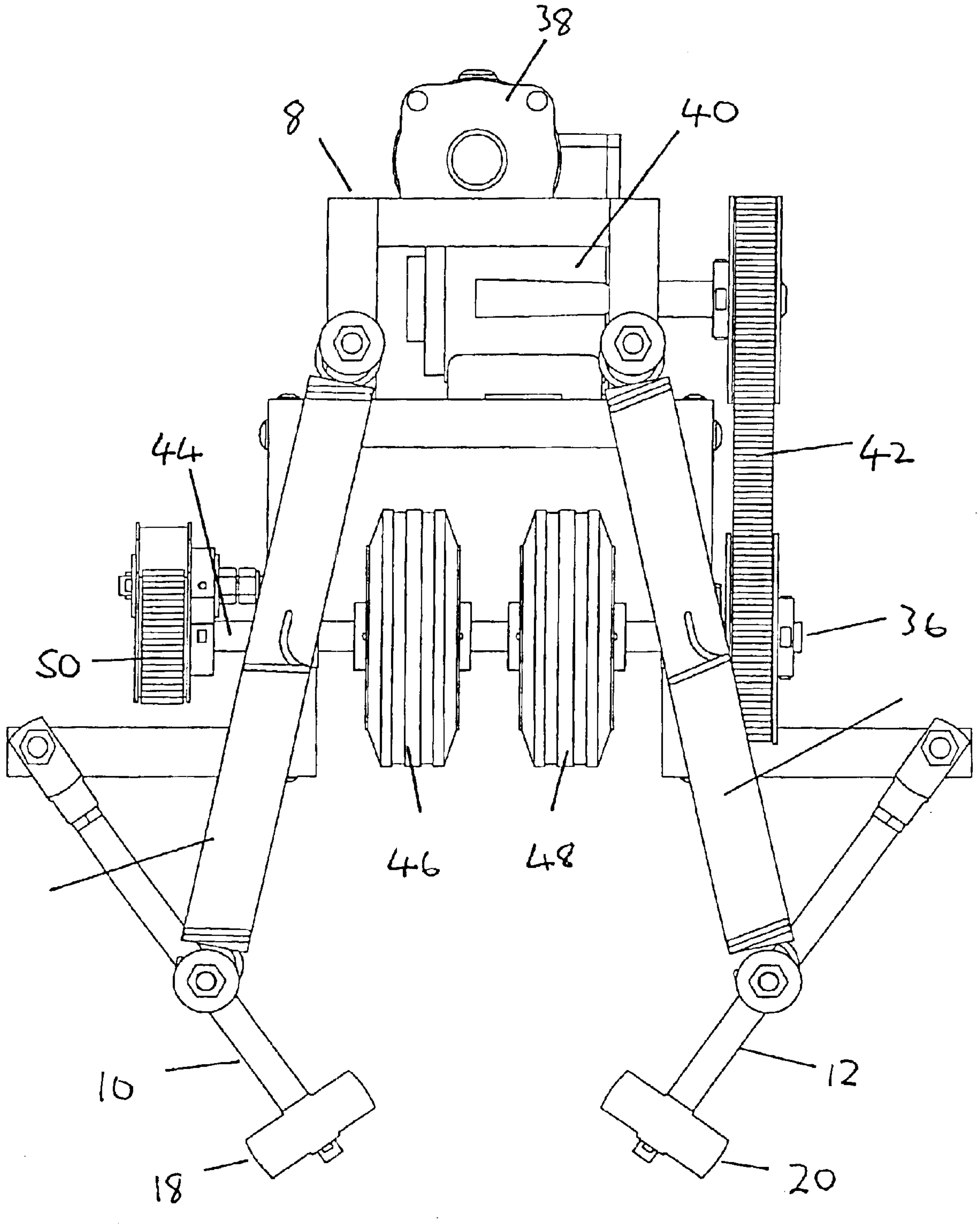
FIG. 10 is a plan view of the carriage.

FIGS. 4 and 5 show how the carriage 2, when refitted to the pole 6, may be used to retrieve the assembly 4 from its elevated position.

FIGS. 6 to 10 show a preferred embodiment of carriage, comprising a traction unit 8, arranged to be mounted substantially on one side of a pole, such that the unit 8 is held in place by four pivotally mounted arms 10, 12, 14, 16 which embrace the pole 6 and frictionally engage the surface of the pole 6 through elastomeric rollers 18, 20, 22, 24 provided at their distal ends.

The distal ends of each opposed pair of arms, e.g. 10, 12, are biassed towards one another and towards the body of the traction unit 8 by respective pairs of springs 26, 28 which extend from the rear of the traction unit 8 to points approximately midway between the ends of each arm.

The traction unit comprises a first pair of elastomeric wheels 32, 34 fixed to an axle 36 which is driven from an electric motor 38 via a reducing gearbox 40 and flexible belt 42. A second axle 44, to which a second pair of wheels 46, 48 are fixed, is in turn driven from the first axle 36 via a second flexible belt 50, held in tension by a tensioning wheel 52.

The innermost edge of each of the wheels 32, 34, 46, 48 is bevelled to present a tangential drive surface to a cylindrical pole to which the unit may be fitted.

However, the two wheels of the upper pair 46, 48 and lower pair 32, 34 of wheels may instead be arranged to rotate in respective planes extending radially from the surface of a cylindrical pole of a given radius.

The carriage is attached to a support pole by prising apart each pair of opposed arms 10, 12 and 14, 16, in turn, whilst pressing the traction unit 8 towards the pole.

When in place upon the pole, a cable (not shown), extending from a ground based control unit (also not shown), supplies electrical power to the motor 38 to rotate the drive wheels 32, 24, 46, 48, thereby causing the carriage to ascend or descend the pole.

As mentioned above, various methods may be employed for fixing an assembly in place upon a pole once the assembly has been raised into position by a carriage.

For example, the assembly may be mounted to the pole via a plurality of rollers, at least one of which may be locked in place at an elevated position to prevent it from rotating. Alternatively, the assembly may comprise an inflatable clamp or a belt which tightens around the pole.

Figure 11:
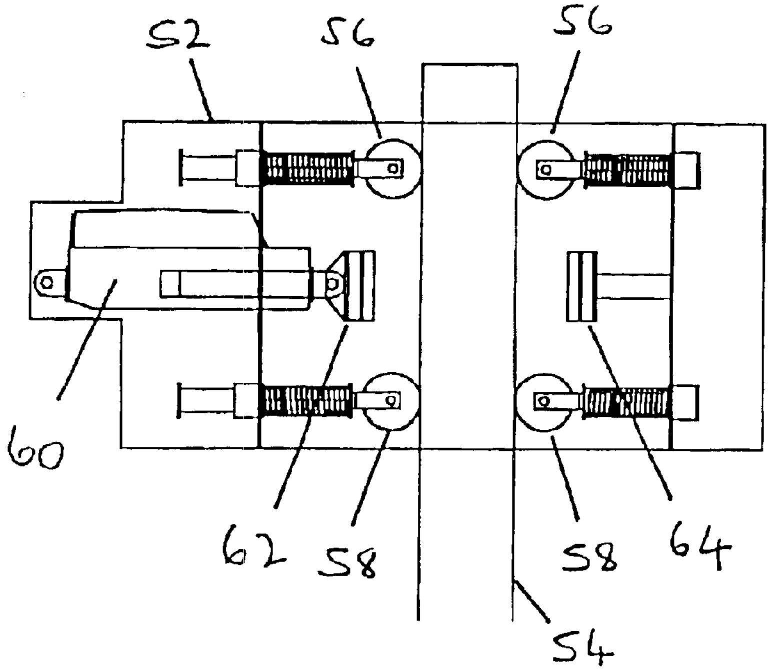
FIG. 11 is a side view of a first embodiment of assembly in accordance with the present invention, mounted to an upright pole.
Figure 12:
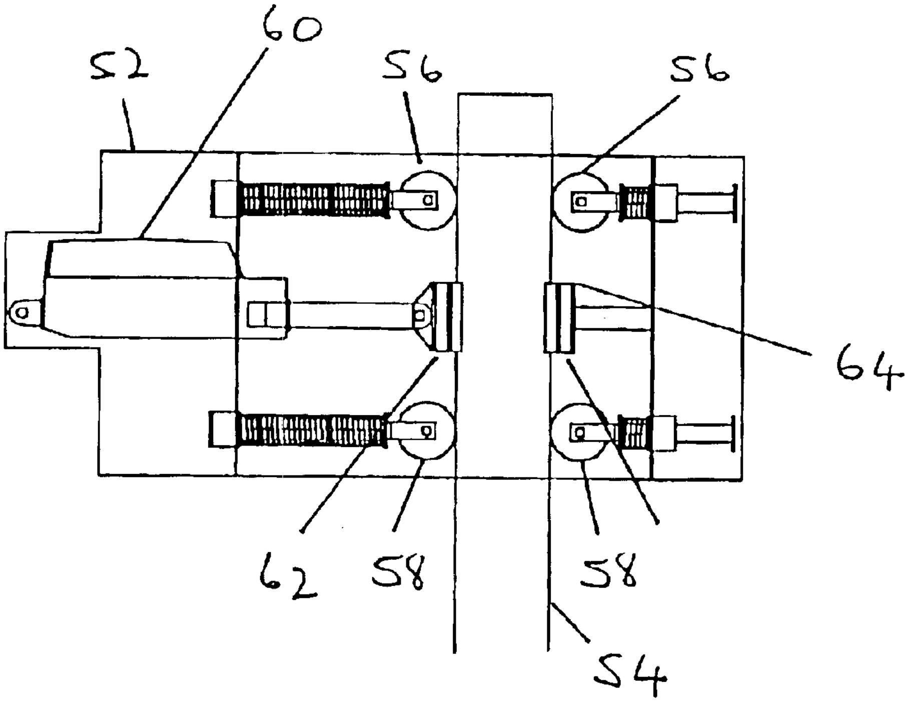
FIG. 12 is a side view of the assembly of FIG. 11 when fixed to the pole.

In the preferred arrangement shown in FIG. 11, an assembly 52 is mounted to a pole 54 via two opposed pairs 56, 58 of sprung guide-rollers. A linear actuator 60 is remotely operable to drive one 62 of two opposed clamping members 62, 64 against the pole 54, as shown in FIG. 12, to clamp the assembly 52 to the pole.

To minimise the weight of the assembly, the linear actuator 60 is an electrical actuator to which power is supplied via an electrical connection (not shown), formed between the assembly 52 and the carriage used for its deployment. The clamping member 62 is driven by a screw (not shown) such that axial movement of the member in inhibited when power to the linear actuator 60 is disconnected.

Figure 13:
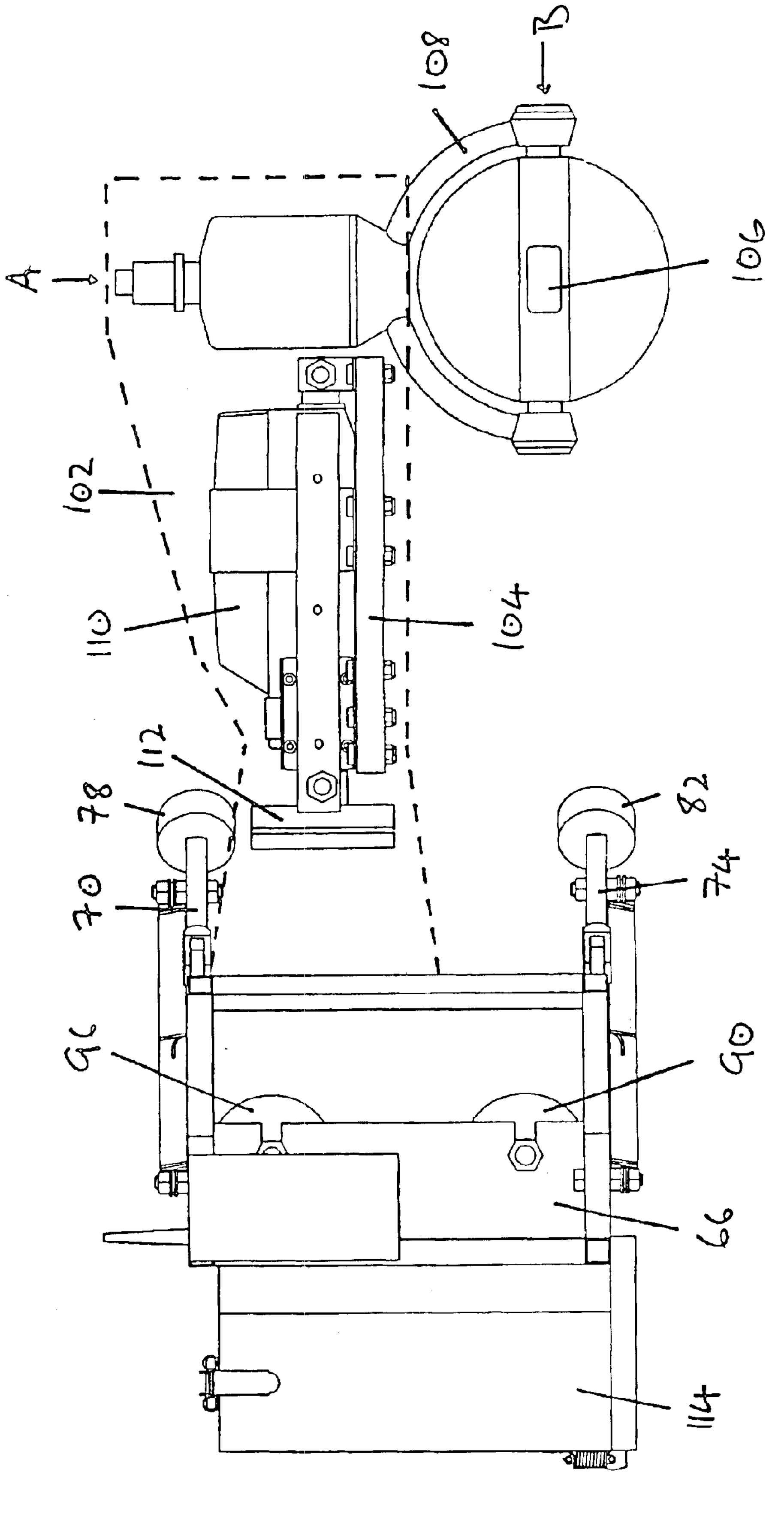
FIG. 13 is a side view of a second embodiment of assembly in accordance with the present invention.
Figure 14:
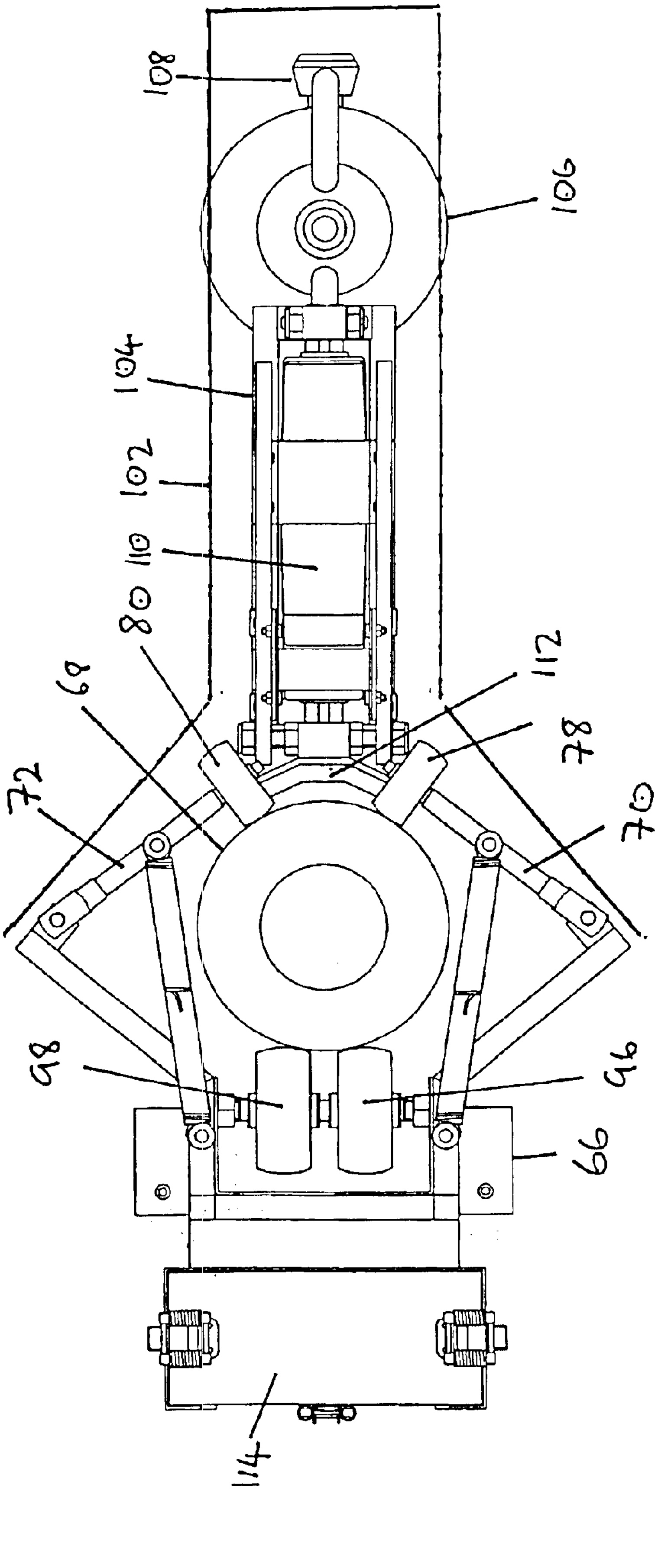
FIG. 14 is a plan view of the assembly of FIG. 13, when fixed to a pole.
Figure 15:
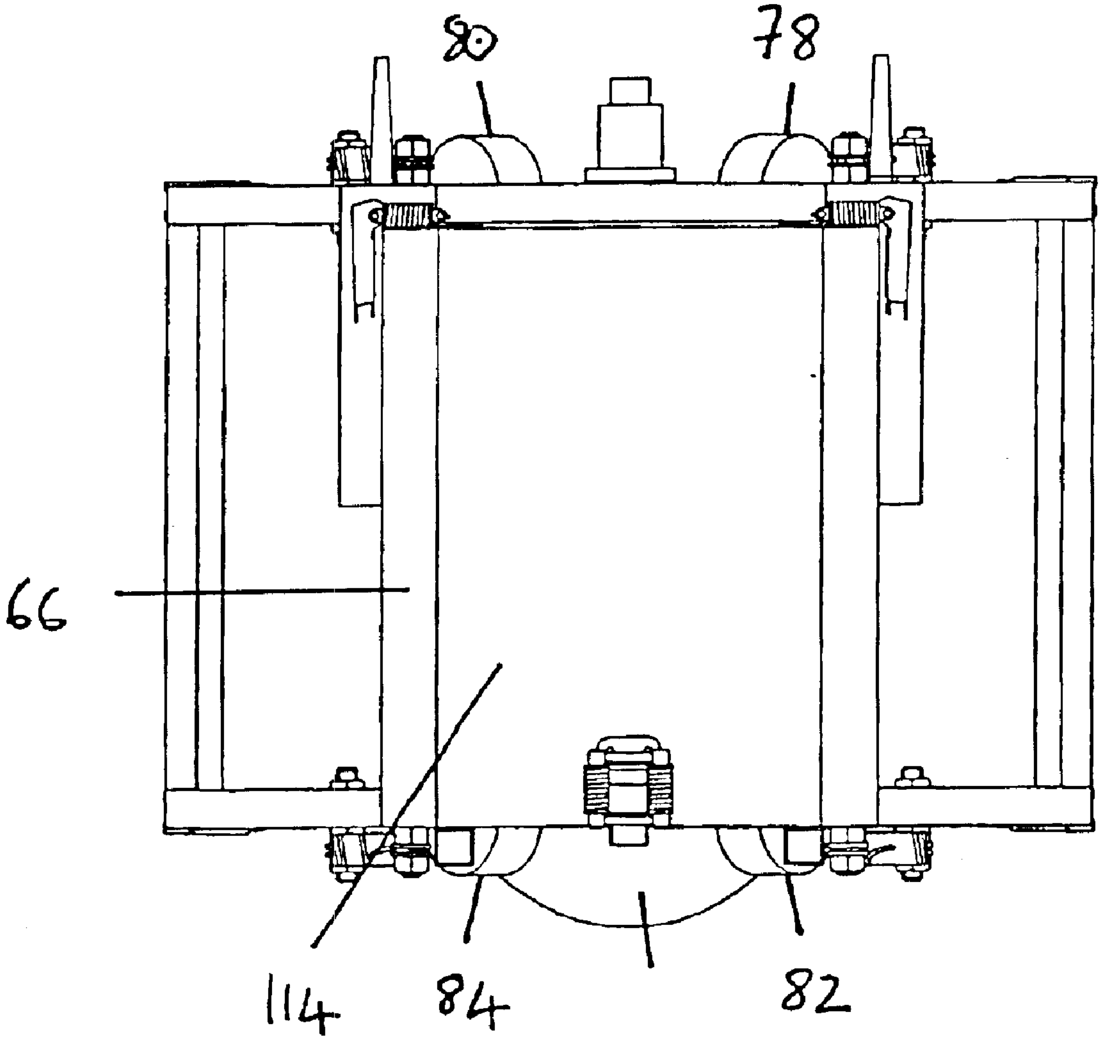
FIG. 15 is a rear elevation of the assembly of FIG. 13.

FIGS. 13 to 15 show a second preferred embodiment of assembly, comprising a skate 66, arranged to be mounted substantially on one side of a pole 68, such that skate is held in place by four pivotally mounted arms 70, 72, 74, 76 which embrace the pole and frictionally engage the surface of the pole through elastomeric rollers 78, 80, 82, 84 provided at their distal ends.

The distal ends of each opposed pair of arms, e.g. 70, 72, are biassed towards one another and towards the body of the skate 66 by respective pairs of springs 86, 88 which extend from the rear of the skate to points approximately midway between the ends of each arm.

The skate 66 comprises a first pair of elastomeric wheels 90, 92 mounted on an axle 94 and a second pair of wheels 96, 98 mounted on an axle 100.

The innermost edge of each of the wheels 90, 92, 96, 98 is bevelled to present a tangential surface to the cylindrical surface of the pole 68.

However, the two wheels of the upper pair 96, 98 and lower pair 90, 92 of wheels may instead be arranged to rotate in respective planes extending radially from the surface of the pole 68.

A bracket 102 extends forwards from either side of the skate 66 and supports a platform 104 to which various devices are mounted.

The assembly is attached to the pole 68, by first attaching the skate 66 to the pole by prising apart each pair of apposed arms 70, 72 and 74, 76, in turn, whilst pressing the skate towards the pole, and then fixing the bracket 102 to either side the skate. Alternatively, one side of the bracket 102 may be pivotally joined to the skate 66 to allow the bracket to be swung to one side to attach the skate to the pole 68.

A surveillance camera 106 is fitted to a bracket 108 at one end of the platform 104, for rotation of the camera about a vertical axis A and a horizontal axis B.

An electrically powered linear actuator 110 is also mounted to the platform 104 for advancing or retracting a clamping member 112 to clamp the pole 68 between the clamping member and the rollers 90, 92, 96, 98 on the opposite side of the assembly.

The linear actuator 110 and the camera 106 are powered by respective batteries secured within a housing 114 fitted to the skate 66, the batteries acting as a counter-balance for the devices supported by the platform 114.

The apparatus thus described provide a cost efficient means for deploying equipment such as lighting and/or surveillance equipment.

What is claimed is:

1. A method for deploying assemblies of equipment, comprising the steps of:

providing an assembly of equipment comprising remotely-operable means for securing the assembly to an upright pole when the assembly is located at an elevated position;

providing a remotely-operable, motorised carriage detachably mounted to the pole;

attaching the motorised carriage to the pole;

remotely operating the motorised carriage for raising the assembly to said elevated position;

operating the securing means of the assembly for securing the assembly to the pole at said elevated position;

operating the motorised carriage to move away from the assembly and for descending the pole, so that the assembly remains secured to the pole at said elevated position; and, detaching the motorised carriage from the pole.

2. An apparatus for deploying assemblies of equipment, comprising:

a first part provided as an assembly of equipment comprising remotely-operable means for securing the assembly to an upright pole when the assembly is located at an elevated position on the pole; and, a second part provided as a remotely-operable, motorised carriage detachably mounted to the pole, wherein the motorised carriage is operable for raising the assembly to, and lowering the assembly from, said elevated position with the motorised carriage being movable away from the assembly when the assembly is located at the elevated position and is secured to the pole using the remotely operable means, for allowing the carriage to descend and be detached from the pole.

3. An apparatus as claimed in claim 2, wherein the motorised carriage comprises a traction unit for mounting substantially on one side of the pole, the traction unit being held in contact with the pole by at least one pair of opposed arms, the two arms of the or each pair being pivotally mounted to, and extending forwards from the traction unit on either side of the pole, the distal ends of the two arms being biassed towards one-another and towards the traction unit to urge respective rollers, provided at each of those ends, into contact with the pole.

4. An apparatus as claimed in claim 3, wherein the traction unit is held in contact with the pole by an upper pair and a lower pair of opposed arms.

5. An apparatus as claimed in claim 3, wherein the motorised carriage is arranged such that, when fitted to a cylindrical pole of a given radius, the two rollers of the or each pair of arms extend substantially radially from the surface of the pole.

6. An apparatus as claimed in claim 3, wherein the traction unit comprises at least one pair of pole-engaging wheels having coplanar axes of rotation, at least one of the wheels being a drive wheel.

7. An apparatus as claimed in claim 6, wherein the two wheels of the or each pair are arranged to rotate in adjacent, parallel planes to engage the pole on either side of its central longitudinal axis.

8. An apparatus as claimed in claim 7, wherein the opposed peripheral edges of the two wheels are bevelled to present respective tangential drive surfaces to a cylindrical pole.

9. An apparatus as claimed in claim 6, wherein the two wheels of the or each pair are arranged to rotate in respective planes extending substantially radially from the surface of a cylindrical pole of a given radius.

10. An apparatus as claimed in claim 3, wherein the traction unit comprises at least an upper and a lower pale-engaging wheel, at least one of the wheels being a drive wheel.

11. An apparatus as claimed in claim 10, wherein the traction unit comprises an upper pair and a lower pair of pole engaging wheels.

12. An apparatus as claimed in claim 3, wherein the distal end of each arm is biassed into contact with the pole by a respective tensioning device, which is pivotally connected between the traction unit and the arm.

13. An apparatus as claimed in claim 2, wherein the assembly comprises a skate for mounting substantially on one side of the pole, the skate being held in contact with the pole by at least one pair of opposed arms, the two arms of the or each pair being pivotally mounted to, and extending forwards from the skate on either side of the pole, the distal ends of the two arms being biassed towards one-another and towards the skate to urge respective rollers, provided at each of those ends, into contact with the pole.

14. An apparatus as claimed in claim 13, wherein the skate Is held in contact with the pole by an upper pair and a lower pair of opposed arms.

15. An apparatus as claimed in claim 14, wherein the assembly is arranged such that, when fitted to a cylindrical pole of a given radius, the two rollers of the or each pair of arms extend substantially radially from the surface of the pole.

16. An apparatus as claimed in claim 13, wherein the skate comprises at least one pair of free-rolling, pole-engaging wheels having coplanar axes of rotation.

17. An apparatus as claimed in claim 16, wherein the two wheels of each pair are arranged to rotate in adjacent, parallel planes to engage the pole on either side of its central longitudinal axis.

18. An apparatus as claimed in claim 17, wherein the opposed peripheral edges of the two wheels are bevelled to present respective tangential surfaces to a cylindrical pole.

19. An apparatus as claimed in claim 16, wherein the two wheels of the or each pair are arranged to rotate in respective planes extending substantially radially from the surface of a cylindrical pole of a given radius.

20. An apparatus as claimed in claim 13, wherein the skate comprises at least an upper and a lower pole-engaging wheel.

21. An apparatus as claimed in claim 20, wherein the skate comprises an upper pair and a lower pair of pole engaging wheels.

22. An apparatus as claimed in claim 13, wherein the distal end of each arm is biassed into contact with the pole by a respective tensioning device, which is pivotally connected between the skate and the arm.

23. An apparatus as claimed in claim 13, wherein the skate is weighted to counter-balance the weight of equipment supported on the opposite side of the pole.

24. An apparatus as claimed in claim 13, wherein said securing means comprise a clamping member arranged to be driven against the opposite side of the pole to the skate.

25. An apparatus as claimed in claim 2, wherein said securing means comprise at least one pole engaging device, the, or each, pole engaging device being operated by an electrical actuator.

26. An apparatus as claimed in claim 25, wherein the, or each, electrical actuator is powered by a battery carried by the skate.

27. An apparatus as claimed in claim 26, wherein said battery provides a counter-balance weight for equipment supported on the opposite side of the pole.

28. An apparatus as claimed in claim 25, wherein said electrical actuator is supplied with power via an electrical connection, formed between the carriage and the platform when the two parts are in contact with one another.

29. An apparatus as claimed in claim 25, wherein the, or each, actuator comprises a linear actuator.

30. An apparatus as claimed in claim 29, wherein said linear actuator comprises a solenoid for displacing a respective clamping member away from the pole surface.

31. An apparatus as claimed in claim 29, wherein said linear actuator comprises a screw for driving a respective clamping member towards, or away from, the surface of the pole.

32. An assembly of equipment to be raised and lowered by a motorised carriage, the assembly comprising remotely-operable means for securing the assembly to an upright pole at an elevated position independently of the motorised carriage, for allowing the assembly to remain in situ at said elevated position as the motorised carriage is lowered and moved away from the assembly.

33. An assembly as claimed in claim 32, comprising a skate for mounting substantially on one side of the pole, the skate being held in contact with the pole by at least one pair or opposed arms, the two arms of the or each pair being pivotally mounted to, and extending forwards from the skate on either side of the pole, the distal ends of the two arms being biassed towards one-another and towards the skate to urge respective rollers, provided at each of those ends, into contact with the pole.

34. An apparatus as claimed in claim 33, wherein the skate is held in contact with the pole by an upper pair and a lower pair or opposed arms.

35. An apparatus as claimed in claim 34, wherein the assembly is arranged such that, when fitted to a cylindrical pole of a given radius, the two rollers of the or each pair of arms extend substantially radially from the surface of the pole.

36. An apparatus as claimed in claim 33, wherein the skate comprises at least one pair of free-rolling, pole-engaging wheels having coplanar axes of rotation.

37. An apparatus as claimed in claim 36, wherein the two wheels of each pair are arranged to rotate in adjacent, parallel planes to engage the pole on either side of its central longitudinal axis.

38. An apparatus as claimed in claim 37, wherein the opposed peripheral edges of the two wheels are bevelled to present respective tangential surfaces to a cylindrical pole.

39. An apparatus as claimed in claim 36, wherein the two wheels of the or each pair are arranged to rotate in respective planes extending substantially radially from the surface of a cylindrical pole of a given radius.

40. An apparatus as claimed in claim 33, wherein the skate comprises at least an upper and a lower pole-engaging wheel.

41. An apparatus as claimed in claim 40, wherein the skate comprises an upper pair and a lower pair of pole engaging wheels.

42. An apparatus as claimed in claim 33, wherein the distal end of each arm is biassed into contact with the pole by a respective tensioning device, which is pivotally connected between the skate and the arm.

43. An apparatus as claimed in claim 33, wherein the skate is weighted to counter-balance the weight of equipment supported on the opposite side of the pole.

44. An apparatus as claimed in claim 33, wherein said securing means comprise a clamping member arranged to be driven against the opposite side of the pole to the skate.

45. An apparatus as claimed in claim 32, wherein said securing means comprise at least one pole engaging device, the or each pole engaging device being operated by an electrical actuator.

46. An apparatus as claimed in claim 45, wherein the or each electrical actuator is powered by a battery carried by the skate.

47. An apparatus as claimed in claim 46, wherein said battery provides a counter-balance weight for equipment supported on the opposite side of the pole.

48. An apparatus as claimed in claim 45, wherein said electrical actuator is supplied with power via an electrical connection, formed between the carriage and the platform when the two parts are in contact with one another.

49. An apparatus as claimed in claim 45, wherein the or each actuator comprises a linear actuator.

50. An apparatus as claimed in claim 49, wherein said linear actuator comprises a solenoid arranged to displace a respective clamping member (normally biassed into contact with the surface of the pole) away from the pole surface.

51. An apparatus as claimed in claim 49, wherein said linear actuator comprises a screw arranged to drive a respective clamping member towards or away from the surface of the pole.

52. An apparatus for deploying an assembly of equipment, the apparatus comprising a motorised carriage having a traction unit for mounting substantially on one side of an upright pole, the traction unit being held in contact with the pole by at least one pair of opposed arms, the two arms of the or each pair being pivotally mounted to, and extending forwards from the traction unit on either side of the pole, the distal ends of the two arms being biassed towards one-another and towards the traction unit to urge respective rollers, provided at each of those ends, into contact with the pole, said apparatus being operable for moving up and down the pole independently of the assembly of equipment.

53. An apparatus as claimed in claim 52, wherein the traction unit is held in contact with the pole by an upper pair and a lower pair of opposed arms.

54. An apparatus as claimed in claim 52, wherein the motorised carriage is arranged such that, when fitted to a cylindrical pole of a given radius, the two rollers of the or each pair of arms extend substantially radially from the surface of the pole.

55. An apparatus as claimed in claim 52, wherein the traction unit comprises at least one pair of pole-engaging wheels having coplanar axes or rotation, at least one of the wheels being a drive wheel.

56. An apparatus as claimed in claim 55, wherein the two wheels of the, or each, pair rotate in adjacent, parallel planes for engaging the pole on either side of its central longitudinal axis.

57. An apparatus as claimed in claim 56, wherein the opposed peripheral edges of the two wheels are bevelled for presenting respective tangential drive surfaces to a cylindrical pole.

58. An apparatus as claimed in claim 55, wherein the two wheels of the, or each, pair rotate in respective planes extending substantially radially from the surface of a cylindrical pole of a given radius.

59. An apparatus as claimed in claim 52, wherein the traction unit comprises at least an upper and a lower pole-engaging wheel, at least one of the wheels being a drive wheel.

60. An apparatus as claimed in claim 59, wherein the traction unit comprises an upper pair and a lower pair of pole engaging wheels.

61. An apparatus as claimed in claim 52, wherein the distal end of each arm is biassed into contact with the pole by a respective tensioning device, which is pivotally connected between the traction unit and the arm.

* * * * *